(12) United States Patent
Koo

(10) Patent No.: US 8,125,572 B2
(45) Date of Patent: Feb. 28, 2012

(54) SYSTEM AND METHOD FOR AUTOMATIC POWER-UP AND POWER-DOWN OF AN OUTPUT VIDEO CIRCUIT

(75) Inventor: Ronald Bonshaw Koo, Mountain View, CA (US)

(73) Assignee: Maxim Integrated Products, Inc., Sunnyvale, CA (US)

( * ) Notice: Subject to any disclaimer, the term of this patent is extended or adjusted under 35 U.S.C. 154(b) by 1730 days.

(21) Appl. No.: 11/081,259

(22) Filed: Mar. 15, 2005

(65) Prior Publication Data

US 2006/0220632 A1    Oct. 5, 2006

(51) Int. Cl.
*H04N 5/63* (2006.01)
*H04N 5/64* (2006.01)

(52) U.S. Cl. .................. 348/730; 348/838

(58) Field of Classification Search .......... 348/730, 348/837, 838, 180, 707, 571, 553–555; 330/2, 330/273, 267, 288, 261, 297, 262, 255, 269; 702/57, 64, 65; 455/343.1, 343.2; 324/908, 324/508, 522, 525, 537, 538, 555, 556, 123 R
See application file for complete search history.

(56) References Cited

U.S. PATENT DOCUMENTS

| | | | | |
|---|---|---|---|---|
| 3,627,967 A * | 12/1971 | Bertolasi et al. | ........... | 219/69.19 |
| 4,571,643 A * | 2/1986 | Namiki | ............. | 386/95 |
| 4,633,167 A * | 12/1986 | Kitts | ............. | 324/556 |
| 5,057,709 A | 10/1991 | Petty et al. | | |
| 5,059,921 A | 10/1991 | Vyne et al. | | |
| 5,059,923 A | 10/1991 | Petty et al. | | |
| 5,313,225 A * | 5/1994 | Miyadera | ............. | 345/102 |
| 5,353,066 A * | 10/1994 | Lee | ............. | 348/505 |
| 5,414,313 A * | 5/1995 | Crescenzi et al. | ............. | 327/351 |
| 5,491,794 A * | 2/1996 | Wu | ............. | 714/23 |
| 5,513,385 A * | 4/1996 | Tanaka | ............. | 455/228 |
| 5,701,599 A * | 12/1997 | Aihara | ............. | 455/186.1 |
| 5,760,848 A * | 6/1998 | Cho | ............. | 348/839 |
| 5,867,060 A * | 2/1999 | Burkett et al. | ............. | 330/2 |
| 5,900,913 A * | 5/1999 | Tults | ............. | 348/468 |
| 6,396,222 B1 * | 5/2002 | Lim | ............. | 315/411 |
| 6,411,330 B1 | 6/2002 | Purcell et al. | | |

(Continued)

OTHER PUBLICATIONS

Robert L. Vyne, et al., "Sleep-Mode Amplifier", Mar. 2, 2005, IEEE 1991 Bipolar Circuits and Technology Meeting 12.2, pp. 2-25.

(Continued)

*Primary Examiner* — Victor Kostak
(74) *Attorney, Agent, or Firm* — North Weber & Baugh LLP

(57) ABSTRACT

A system and method for configuring a video circuit into a low power consumption mode and a high power consumption mode. The system comprises an input signal detection circuit adapted to generate a first signal indicative of whether an input video signal is present at the input of the video circuit; an output load detection circuit adapted to generate a second signal indicative of whether a load is connected to the output of the video circuit; and a control device adapted to generate a third signal to control the power consumption mode of the video circuit in response to the first and second signals. The method entails detecting whether an input video signal is present; detecting whether the load is present; and configuring the video circuit for high power consumption if both the input video signal and the load are present, otherwise configuring the video circuit for low power consumption.

24 Claims, 4 Drawing Sheets

U.S. PATENT DOCUMENTS

| | | |
|---|---|---|
| 6,515,716 B1* | 2/2003 | Suzuki et al. ............... 348/730 |
| 6,593,975 B1* | 7/2003 | Oh ............................... 348/730 |
| 6,650,376 B1* | 11/2003 | Obitsu ......................... 348/730 |
| 6,731,346 B1* | 5/2004 | Nonomura et al. ........... 348/554 |
| 6,744,310 B2* | 6/2004 | Honda ............................ 330/2 |
| 6,757,028 B2* | 6/2004 | Yamamoto ................... 348/731 |
| 6,940,440 B1* | 9/2005 | Iacob ............................ 341/144 |
| 7,317,495 B2* | 1/2008 | Takahashi .................... 348/838 |
| 7,336,978 B2 | 2/2008 | Kim .............................. 455/574 |
| 2002/0036636 A1* | 3/2002 | Yanagi et al. ................ 345/211 |
| 2004/0080675 A1* | 4/2004 | Hoshino ....................... 348/731 |
| 2005/0048960 A1* | 3/2005 | Yamauchi et al. ............ 455/418 |
| 2005/0055591 A1* | 3/2005 | Cho .............................. 713/320 |
| 2005/0076088 A1* | 4/2005 | Kee et al. ..................... 709/206 |
| 2005/0213929 A1* | 9/2005 | Cheng ............................ 386/46 |
| 2006/0178127 A1* | 8/2006 | Kawasaki .................. 455/343.2 |

OTHER PUBLICATIONS

"Power-Miser OP AMP Draws Current Only When Awakened", Electronic Design, Penton Publication, Dec. 5, 1991.

"Sleep-Mode Two-State, Micropower Operational Amplifier", MC33102 spec. sheet, Motorola, Inc., 1996, pp. 1-14.

* cited by examiner

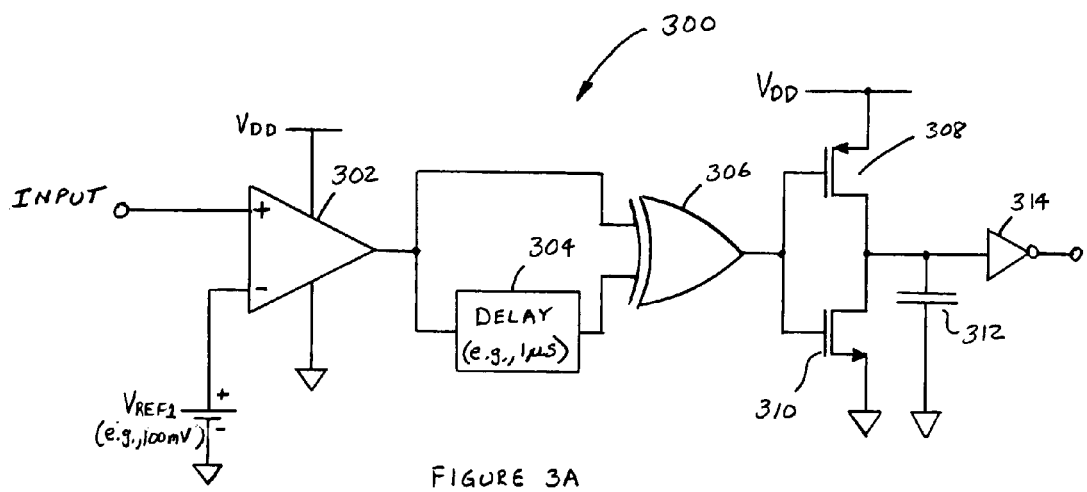
FIGURE 3A
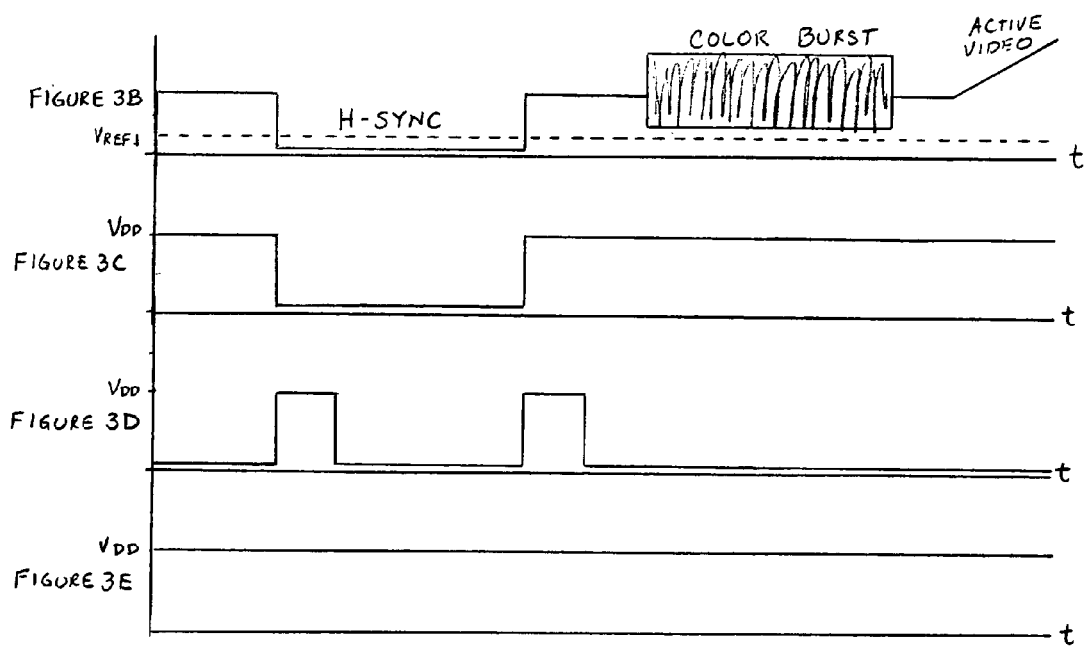

SYSTEM AND METHOD FOR AUTOMATIC POWER-UP AND POWER-DOWN OF AN OUTPUT VIDEO CIRCUIT

FIELD OF THE INVENTION

This invention relates generally to video circuits, and in particular, to a system and method for automatic power-up and power-down of an output video circuit.

BACKGROUND OF THE INVENTION

Many of today's portable devices, such as MP3 players, portable DVD players, digital cameras, camcorders, notebook computers, etc., now include video outputs such as composite video, S-video, component video, and analog RGB video with horizontal sync and vertical sync. Such portable devices typically include an output video circuit which receives an input video signal from a digital-to-analog converter (DAC). Generally, the output video circuit includes a low pass filter for filtering the output signal of the DAC, and an amplifier to provide some gain to the filtered signal (e.g., 6 dB). Typically, the output video circuit of these portable devices remain ON (i.e., continues to draw power) even when there is no load connected to the video output.

With portable devices, conservation of battery power is given considerable attention in the design of these devices. A portable device having a longer operating time without requiring a recharge of its internal battery provides a competitive advantage for the device. However, a portable device that maintains its output video circuit powered ON even when there is no load connected to its video output results in a needless waste of battery power.

To address this issue, some prior portable devices include a mechanical sense pin on the output video connector. When a load is connected to the output video connector, the mechanical sense pin is depressed, which is sensed by a microcontroller. In response, the microcontroller turns ON the output video circuit. When the load is subsequently removed, the mechanical sense pin is released, which is also sensed by the microcontroller. In response, the microcontroller turns OFF the output video circuit.

There are several issues with the mechanical sense pin device. First, such connector having a built-in mechanical sense pin is typically expensive, which adds to the cost of manufacturing the portable device. Second, the sense pin being mechanical, is subject to wear and tear and possible damage. Third, generally software is required to control the microprocessor to recognize when the mechanical sense pin has been depressed, and in response, activate the output video circuit; and to recognize when the mechanical sense pin has been released, and in response, de-activate the output video circuit.

SUMMARY OF THE INVENTION

An aspect of the invention relates to a system for configuring a video circuit into a relatively low power consumption mode and a relatively high power consumption mode. The system comprises an input signal detection circuit adapted to generate a first signal indicative of whether an input video signal is present at the input of the video circuit. The system also comprises an output load detection circuit adapted to generate a second signal indicative of whether a load is connected to the output of the video circuit. Additionally, the system comprises a control device adapted to generate a third signal responsive to the first and second signals, wherein the third signal controls the power consumption mode of the video circuit.

Another aspect of the invention relates to a method for configuring a video circuit into a relatively low power consumption mode and a relatively high power consumption mode. The method comprises detecting whether an input video signal is present at the input of the video circuit; detecting whether a load is connected to the output of the video circuit; and configuring the video circuit into the relatively high power consumption mode if the input video signal is present at the input of the video circuit and the load is connected to the output of the video circuit, or configuring the video circuit into the relatively low power consumption mode if either or both the input video signal is not present at the input of the video circuit or said output load is not connected to the output of the video circuit.

Other aspects, features, and techniques of the invention will be apparent to one skilled in the relevant art in view of the following detailed description of the exemplary embodiments of the invention.

BRIEF DESCRIPTION OF THE DRAWINGS

FIG. 3A illustrates a schematic diagram of an exemplary video signal detection circuit in accordance with another embodiment;

FIGS. 3B-3E illustrates timing diagrams of exemplary signals received and generated by the exemplary input video signal detection circuit in accordance with another embodiment of the invention;

FIG. 4B-1 illustrates a schematic diagram of an exemplary output load detection sub-circuit (for use when the video amplifier is ON) in accordance with another embodiment of the invention; and FIG. 4B-2 illustrates a schematic diagram of another exemplary output load detection sub-circuit (for use when the video amplifier is ON) in accordance with another embodiment of the invention.

DETAILED DESCRIPTION OF THE EXEMPLARY EMBODIMENTS

Figure 1:
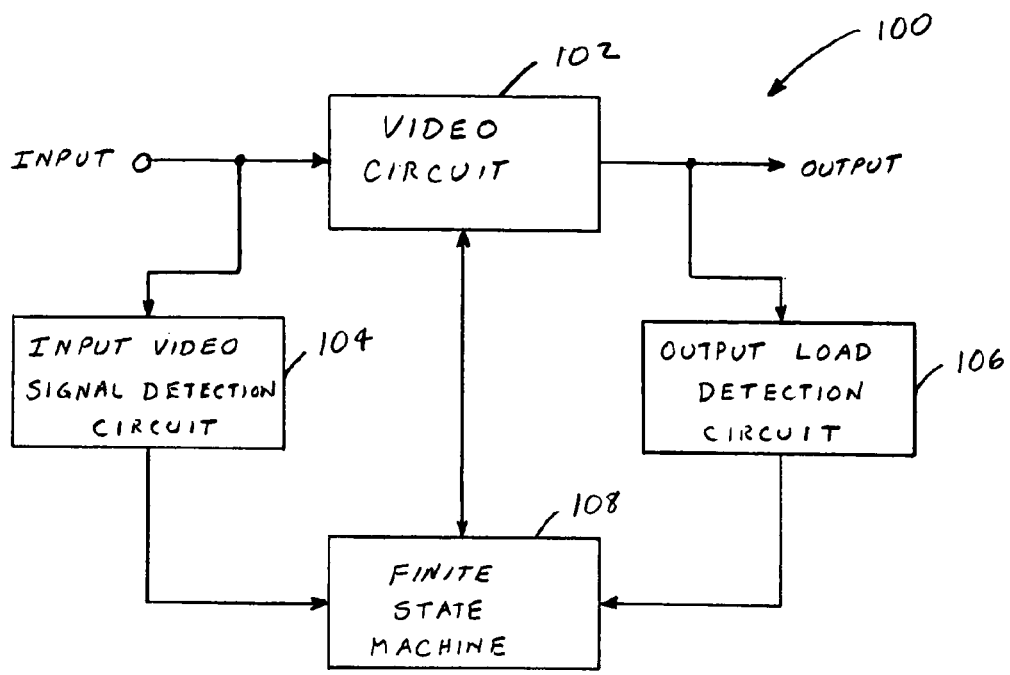
FIG. 1 illustrates a block diagram of an exemplary system for automatic power-up and power-down of an output video circuit in accordance with an embodiment of the invention.

FIG. 1 illustrates a block diagram of an exemplary system 100 for automatic power-up and power-down of a video circuit 102 in accordance with an embodiment of the invention. In summary, the system 100 detects the presence of a video signal at the input of the video circuit 102, detects the presence of a load connected to the output of the video circuit 102, and turns ON the output video circuit if both the input video signal and the output load are present. If either or both of these conditions are not present, the system 100 turns OFF the output video circuit 102. Thus, the system 100 is capable of extending the life of a battery that supplies power to the video circuit 102 since the circuit 102 is turned ON only when it is in use (i.e., when it receives an input video signal and a load is connected to its output).

In more detail, the exemplary system 100 comprises a video circuit 102, an input video signal detection circuit 104, an output load detection circuit 106, and a finite state machine 108. The video circuit 102 may comprise a low pass filter (LPF) to filter the input video signal, which is typically generated by a digital-to-analog converter (DAC). The video circuit 102 may also include a video amplifier to amplify the filtered video signal by a predetermined gain (e.g., approximately 6 dB). The input video signal could be in any number of formats, such as composite video, S-video, component video, analog RGB video with horizontal sync and vertical sync, and others. The video circuit 102 may generate any type of output, such as composite video, S-video, component video, analog RGB video with horizontal sync and vertical sync, and others. Additionally, the video circuit 102 may also be a digital video interface, such as a High-Definition Multimedia Interface (HDMI), a Serial Digital Interface (SDI), a Digital Video Interface (DVI), ITU BT.656 interface, and other digital interfaces.

The input video signal detection circuit 104 detects the presence of a video signal at the input of the video circuit 102. Specifically, the input video signal detection circuit 104 generates an output dependent on whether a video signal is present at the input of the video circuit 102. In the exemplary detailed embodiment discussed below, the input video signal detection circuit 104 generates a logic high signal if it detects the presence of a video signal at the input of the video circuit 102, and generates a logic low signal if it does not detect the presence of a video signal at the input of the output video circuit 102.

The output load detection circuit 106 detects whether a load is connected to the output of the video circuit 102. Specifically, the output load detection circuit 106 generates an output dependent on whether a load is connected to the output of the video circuit 102. In the exemplary detailed embodiment discussed below, the output load detection circuit 106 generates a logic high signal if it detects a load connected to the output of the video circuit 102, and generates a logic low signal if it does not detect a load connected to the output of the video circuit 102. As is discussed further below, the output load detection circuit 106 includes a first sub-circuit to detect the presence of a load at the output of the video circuit 102 when the video amplifier is ON, and a second sub-circuit to detect the presence of a load at the output of the video circuit 102 when the video amplifier is OFF.

The finite state machine 108 receives the respective signals generated by the input video signal detection circuit 104 and the output load detection circuit 106, and based on these signals, generates an output signal to power-down or power-up the video circuit 102. Specifically, if the signal generated by the input video signal detection circuit 104 indicates the presence of a video signal at the input of the video circuit 102, and the signal generated by the output load detection circuit 106 indicates the presence of a load connected to the output of the video circuit 102, then the finite state machine 108 generates an output signal to power-up the output video circuit 102. On the other hand, if the signal generated by the input video signal detection circuit 104 indicates the absence of a video signal at the input of the video circuit 102, and/or the signal generated by the output load detection circuit 106 indicates the absence of a load connected to the output of the video circuit 102, then the finite state machine 108 generates an output signal to power-down the video circuit 102. The following state diagram further exemplifies this operation.

Figure 2:
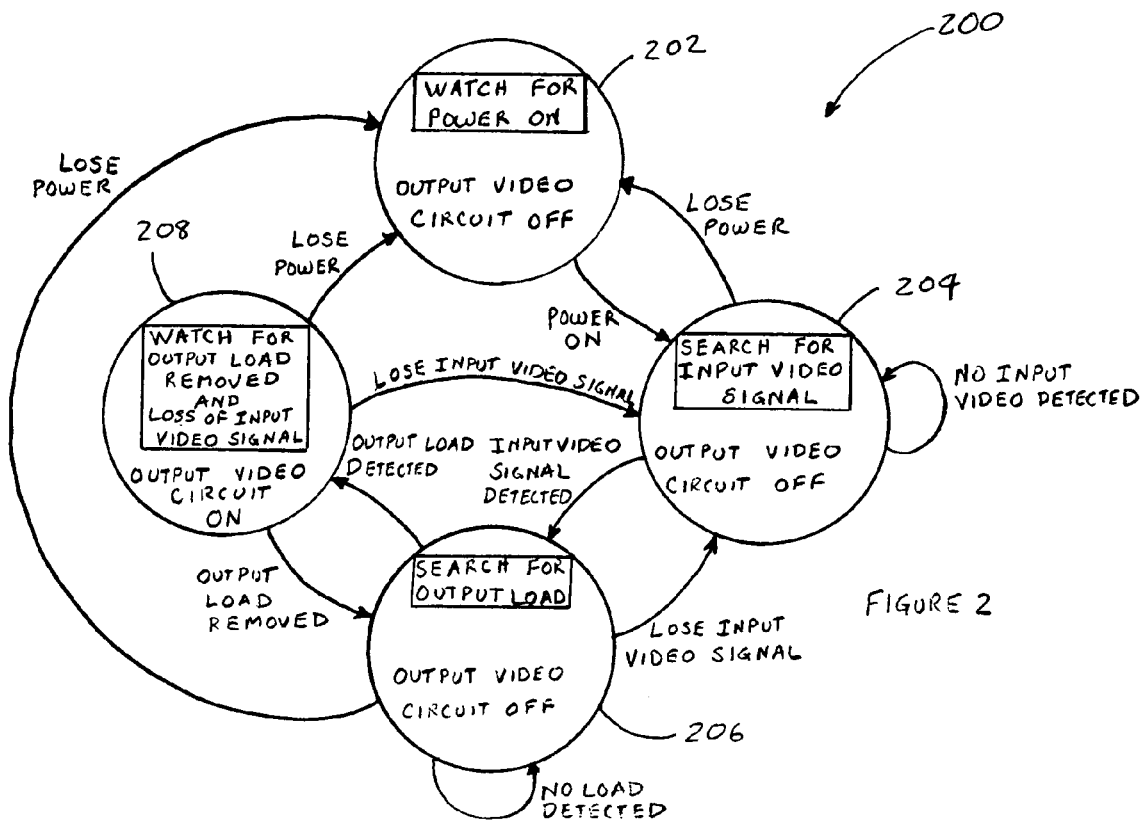
FIG. 2 illustrates a state diagram of exemplary states in which the exemplary finite state machine operates in accordance with another embodiment of the invention.

FIG. 2 illustrates a state diagram of exemplary states 200 in which the exemplary finite state machine 108 operates in accordance with another embodiment of the invention. In this example, the various states 200 of the finite state machine 108 include a Watch for Power On state 202, a Search for Input Video Signal state 204, a Search for Output Load state 206, and a Watch for Output Load Removed and Loss of Input Video Signal state 208.

When the system 100 is first powered on, the finite state machine 108 initializes itself in the Watch for Power On state 202. In the Watch for Power On state 202, the finite state machine 102 is detecting when the system 100 is powered on. In this state 202, the video circuit 102 is in a relatively low power consumption mode (e.g., an OFF state). After the finite state machine 108 detects the system 100 being powered on, the finite state machine 108 changes states from the Watch for Power On state 202 to the Search for Input Video Signal state 204.

In the Search for Input Video Signal state 204, the finite state machine 108 is monitoring for the presence of an input video signal by monitoring the output of the input video signal detection circuit 104 for a logic high signal. In this state 204, the finite state machine 108 maintains the video circuit 102 in the relatively low power consumption mode (e.g., the OFF state). If it does not detect the logic high signal generated by the input video signal detection circuit 104, the finite state machine 108 remains in state 204 still waiting to the presence of the input video signal. If while in state 204 the system 100 loses power, then upon power up the finite state machine 108 again returns initially to state 202. If while in state 204 the finite state machine 108 detects the presence of the input video signal by sensing a logic high signal generated by the input video signal detection circuit 104, the finite state machine 108 changes states from the Search for Input Video Signal state 204 to the Search for Output Load state 206.

In the Search for Output Load state 206, the finite state machine 108 is monitoring for the presence of a load connected to the output of the video circuit 102 by monitoring the output of the output load detection circuit 106 for a logic high signal. In this state 206, the finite state machine 108 maintains the output video circuit 102 in the relatively low power consumption mode (e.g., the OFF state). If it does not detect the logic high signal, the finite state machine 108 remains in state 206 still waiting to detect the presence of a load at the output of the video circuit 102. If while in state 206 the system 100 loses power, then upon power up the finite state machine 108 again returns initially to state 202. If while in state 206 the finite state machine 108 detects the presence of the load by sensing the logic high signal generated by the output load detection circuit 106, the finite state machine 108 changes states from the Search for Output Load state 206 to the Watch for Output Load Removed and Loss of Input Video Signal state 208.

In the Watch for Output Load Removed and Loss of Input Video Signal state 208, the finite state machine 108 is monitoring for the absence of an input video signal by monitoring the output of the input video signal detection circuit 104 for a logic low signal, and monitoring for the removal of the load connected to the output of the video circuit 102 by monitoring the output of the output load detection circuit 106 for a logic low signal. In this state 208, the finite state machine 108 maintains the video circuit 102 in the relatively high power consumption mode (e.g., an ON state). If it does not detect either or both of the logic low signals, the finite state machine 108 remains in state 208 to perform the same detection. If while in state 208 the system 100 loses power, then upon power up the finite state machine 108 again returns initially to state 202.

If while in state 208 the finite state machine 108 detects the removal of the load by sensing a logic low signal generated by the output load detection circuit 106, the finite state machine 108 changes states from the Watch for Output Load Removed and Loss of Input Video Signal state 208 to the Search for Output Load state 206. In this state 206, the finite state machine 108 generates an output signal to configure the video circuit 102 in the relatively low power consumption mode. If while in state 208 the finite state machine 108 detects the absence of the input video signal by sensing a logic low signal generated by the input video signal detection circuit 104, the finite state machine 108 changes states from the Watch for Output Load Removed and Loss of Input Video Signal state 208 to the Search for Input Video Signal state 204. In this state 206, the finite state machine 108 generates an output signal to configure the output video circuit 102 in the relatively low power consumption mode.

Having described the system 100 and its various states 200, the following describes exemplary detailed embodiments of the input video signal detection circuit 104 and the output load detection circuit 106. Again, the following are merely illustrative, and could be implemented in other manners.

FIG. 3A illustrates a schematic diagram of an exemplary input video signal detection circuit 300 in accordance with another embodiment. The exemplary input video signal detection circuit 300 may be a detailed version of the input video detection circuit 104 discussed above. In summary, the input video detection circuit 300 generates a logic high signal when it senses the sync pulses (e.g., H-Sync, V-Sync, and/or Macrovision copy-protection pulses) of an input composite video signal. In this example, the input video signal is compliant with the Society for Motion Picture and Television Engineers Standard 170M-1999: Composite Analog Video Signal—NTSC for Studio Applications. It shall be understood that the input video signal could be compliant with other standards.

The input video signal detect circuit 300 comprises a comparator 302, a reference voltage source $V_{REF1}$, a delay unit 304, an exclusive-OR gate 306, a pair of field effect transistors (FETs) 308 and 310, a capacitor 312, and an inverter 314. The comparator 302 and reference voltage source $V_{REF1}$ extract the sync pulses from the input video signal (i.e., filters the active video, color burst, and data). The delay unit 304 and exclusive-OR gate 306 operate as an edge detector to generate a pulse for each edge of the sync pulse. The FET 310 is relatively strong, i.e., can sink a relatively large current, while FET 308 is weak, i.e., can source a relatively small current. Whenever the output of the exclusive-OR gate 306 is at a high logic level, the FET 310 quickly discharges the capacitor 312 to ground, essentially resetting the circuit. Whenever the output of the exclusive-OR gate 306 is at a low logic level, the FET 308 slowly charges up the capacitor 312. The circuit 300 is designed such that the video signal should be absent for a duration of many horizontal lines before the capacitor 312 charges up enough to flip the output of the inverter 314. The inverter 314 operates to invert the voltage across the capacitor 312, thereby generating a logic level signal indicative of whether an input video signal is present at the input of the video circuit 102.

More specifically, the positive input of the comparator 302 is adapted to receive the input video signal, the negative input of the comparator 302 is adapted to receive the reference voltage generated by the reference voltage source $V_{REF1}$, and the output of the comparator 302 is coupled to an input of the exclusive-OR gate 306 and to an input of the delay unit 304. The delay unit 304, in turn, includes an output coupled to the other input of the exclusive-OR gate 306.

The exclusive-OR gate 306 includes an output coupled to the gates of FETs 308 and 310. The FETs 308 and 310 are in a push-pull configuration with the source of FET 308 coupled to the power supply rail $V_{DD}$, the source of FET 310 coupled to the ground potential rail, and the drains of FETs 308 and 310 coupled to each other. The capacitor 312 is coupled at one end to the drains of the FETs 308 and 310, and at the other end to the ground potential rail. The inverter 314 includes an input coupled to the drains of the FETs 308 and 310, and an output adapted to generate a logic level signal indicative of whether an input video signal is present at the input of the input video signal detection circuit 300. The operation of the input video signal detection circuit 300 is discussed below with reference to the timing diagrams illustrated in FIGS. 3B-3E.

FIG. 3B illustrates a timing diagram of an NTSC input video signal at the input of the comparator 302 in relationship with the reference voltage $V_{REF1}$ at the other input of the comparator 302. The function of the comparator 302 is to generate a signal that only includes the sync pulses of the NTSC input video signal. For each frame, the NTSC input video signal includes composite sync pulses, segments of video information, and segments of data information. Accordingly, for each frame the comparator 302 filters out the segments of video information and segments of data information. In order to perform this function, the voltage reference $V_{REF1}$ should be set above the lowest voltage of the sync pulses, and below the lowest voltage of the video and data information segments (e.g., should be set to approximately 100 millivolts).

FIG. 3C illustrates a timing diagram of the signal at the output of the comparator 302. As discussed above, the comparator 302 filters out the video and data information segments. Accordingly, at the output of the comparator 302, the signal contains only the sync pulses of the input video signal as shown.

FIG. 3D illustrates a timing diagram of the signal at the output of the exclusive-OR gate 306. As discussed above, the delay unit 304 and the exclusive-OR gate 306 operate as an edge detector in generating a pulse for each edge of the composite sync pulse. More specifically, the exclusive-OR gate 306 generates a logic high level voltage (e.g., approximately $V_{DD}$) when the inputs are at different logic levels, and generates a logic low level (e.g., approximately 0 Volt) when the inputs are at the same logic levels. When the comparator 302 generates the falling edge of the sync pulse, the inputs to the exclusive-OR gate 306 are at different logic levels. Accordingly, the exclusive-OR gate 306 generates a logic high level, which is the rising edge of the first pulse of the exclusive-OR output signal. After a predetermined time delay associated with the time delay unit 304 (e.g., 1 microsecond), the inputs to the exclusive-OR gate 306 become the same logic levels. Accordingly, the exclusive-OR gate 306 generates a logic low level, which is the falling edge of the first pulse of the signal at the output of the exclusive-OR gate 304. Similarly, the rising edge of the sync pulse causes the exclusive-OR gate 306 to generate another pulse having a width governed by the delay unit 304 (e.g., 1 microsecond).

FIG. 3E illustrates a timing diagram of the signal at the output of the inverter 314 (i.e., the output of the input video signal detection circuit 300). As discussed above, the FETs 308 and 310 and capacitor 312 determine whether an input video signal is present. If the voltage on capacitor 312 is at a logic low level, then an input video signal is present. If the voltage on capacitor 312 is at a high logic level, then an input video signal is not present. The inverter 314 inverts this voltage on capacitor 312. More specifically, the pulses generated by the exclusive-OR gate 306 in response to the edges of the sync pulse causes the FET 308 to be in cutoff and FET 310 to conduct. This action forces the voltage on the capacitor 312 to be driven to a logic low level (e.g., ground potential). The inverter 314, in turn, generates a logic high level signal (e.g., approximately $V_{DD}$) in response to receiving the logic low level signal at its input. Thus, the input video detection circuit 300 generates a logic high level signal in response to detecting the sync pulses of the input video signal.

If, on the other hand, the input video signal is not present, the input video detection circuit 300 generates a logic low level signal. In such a case, the constant voltage at the positive input of the comparator 302 when there is no input video signal present causes the comparator 302 to generate a constant voltage. This constant voltage, in turn, causes the exclusive-OR gate 306 to generate a constant low logic level voltage. The low logic level voltage, in turn, causes FET 308 to conduct and FET 310 to be in cutoff. This action forces the voltage on the capacitor 112 to rise to a logic high level (e.g., approximately $V_{DD}$). The inverter 314 generates a logic low level in response to sensing the logic high level at its input. Thus, the input video detection circuit 100 generates a logic low level signal in the absence of an input video signal.

Figure 4A:
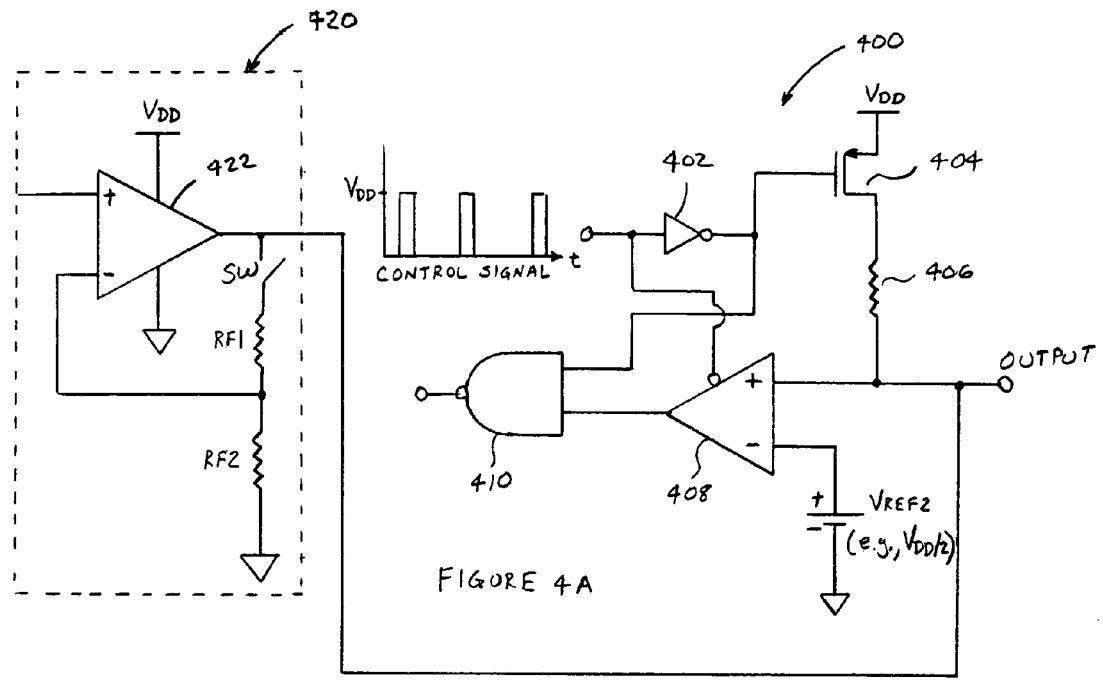
FIG. 4A illustrates a schematic diagram of an exemplary output load detection sub-circuit (for use when the video amplifier is OFF) in accordance with another embodiment of the invention.

FIG. 4A illustrates a schematic diagram of an exemplary output load detection first sub-circuit 400 in accordance with another embodiment of the invention. The first sub-circuit 400 is used to detect a load connected to the output of the video circuit 102 when the video amplifier of the video circuit 102 is OFF. In particular, the first sub-circuit 400 generates a logic high level signal when a load is connected to the output of the video circuit 102, and a logic low level signal when no load is connected to the output of the video circuit 102.

More specifically, the output load detection first sub-circuit 400 comprises an inverter 402, a FET 404, a resistor 406, a voltage reference source $V_{REF2}$, a latching comparator 408, and a NAND gate 410. The inverter 402, the FET 404, and the resistor 406 operate to generate periodic test current at the output of the video circuit 102 in response to a control signal. The latching comparator 408 and reference voltage source $V_{REF2}$ operate to generate a logic level signal indicative of whether the test current is above or below a threshold level (indicating whether a load is connected to the output). The NAND gate 410 operates to generate the inverted logic level output of the latching comparator 408 after a test current cycle is completed.

More specifically, the input to the inverter 402 and the enable input of the latching comparator 408 receive a control signal comprising a plurality of pulses having a relatively small duty cycle (e.g., one percent). The output of the inverter 402 is coupled to the gate of the FET 404 and to an input of the NAND gate 410. The FET 404 includes a source coupled to the power supply rail $V_{DD}$ and a drain coupled to the positive input of the latching comparator 408 by way of resistor 406. The voltage reference source $V_{REF2}$ is coupled between the negative input of the latching comparator 408 and the ground potential rail. The output of the latching comparator 408 is coupled to the other input of the NAND gate 410. The NAND gate 410 generates the logic level signal that indicates whether a load is connected to the output of the video circuit 102.

As shown in FIG. 4A, the output load detection first sub-circuit 400 is coupled to the output of the video amplifier 420 of the output video circuit 102. More specifically, the video amplifier 420 comprises an operational amplifier 422, a switching element SW, and a pair of feedback resistors RF1 and RF2. The switching element SW and the feedback resistors RF1 and RF2 are connected in series between the output of the operational amplifier 422 and the ground potential rail.

The negative input of the operational amplifier 422 is connected to the node between the feedback resistors RF1 and RF2. The positive input of the operational amplifier 422 is adapted to receive the video signal generated at the output of the low pass filter (not shown). The output of the operational amplifier 422 is also coupled to the positive terminal of the latching comparator 408 of the output load detection first sub-circuit 400. Since the output load detection first sub-circuit 400 detects whether a load is connected to the output of the video circuit 102 when the video amplifier 420 is in the OFF state, the switching element SW is shown in the open position to produce a relatively high output impedance at the output of the video circuit 102.

The output load detection first sub-circuit 400 operates as follows. When a pulse of the control signal is applied to the input of the inverter 402, the inverter 402 generates a low logic level signal (e.g., approximately 0 Volt). Consequently, the low logic level at the gate of the FET 404, causes the FET 404 to conduct, which causes a test current to flow through the resistor 406. The amount of current flowing through resistor 406 depends on whether there is a load connected to the output of the video circuit 102. When there is no load connected to the output of the video circuit 102, the impedance at the output is relatively high because of the high impedances at the positive input of the latching comparator 408 and the output of the video operational amplifier 422. When there is a load connected to the output, the impedance at the output is essentially that of the load (e.g., 150 Ohms). Accordingly, the current flowing through resistor 406 is relatively large when there is a load connected to the output, and relatively low when there is no load connected to the output.

Consequently, the DC voltage at the positive input of the latching comparator 408 is below the reference voltage $V_{REF2}$ (e.g., $V_{DD}/2$) when there is a load present because of the relatively large voltage drop across resistor 406 due to the relatively large test current, and above the reference voltage $V_{REF2}$ when there is no load present because of the relatively small voltage drop across resistor 406 due to the relatively small test current. Thus, during a pulse of the control signal, the output of the latching comparator 408 generates a logic level signal which indicates whether there is a load present at the output of the video circuit 102 (e.g., a low logic level when there is a load, and a high logic level when there is no load). The control signal is applied to the latch input of the latching comparator 408. When the control signal transitions from the high logic level to the low logic level, the latching comparator 408 latches its state.

The output of the inverter 402 is also coupled to an input of the NAND gate 410. Thus, during a pulse of the control signal, the input to the NAND gate 410 is at a low logic level. This in effect disables the NAND gate 410 during the load testing phase. During an absence of a pulse, the input to the NAND gate 410 is at a logic high level, which in effect enables the NAND gate 410. During such time, the latching comparator 408 has already latched the result of the prior load testing phase. Thus, the NAND gate 410 essentially inverts the output of the latching comparator 408 to generate a logic level signal that indicates whether there is a load present at the output of the video circuit 102 (e.g., a high logic level when there is a load, and a low logic level when there is no load).

Figures 1, 4B:
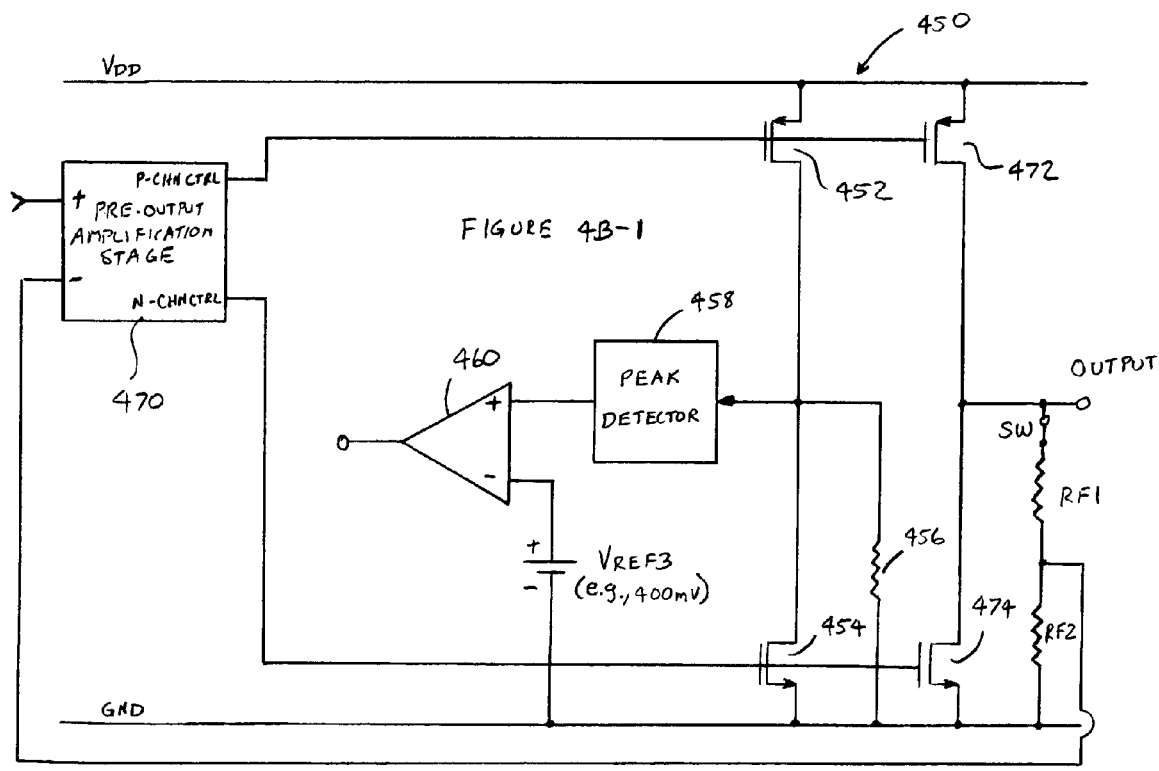
Figures 2, 4B:
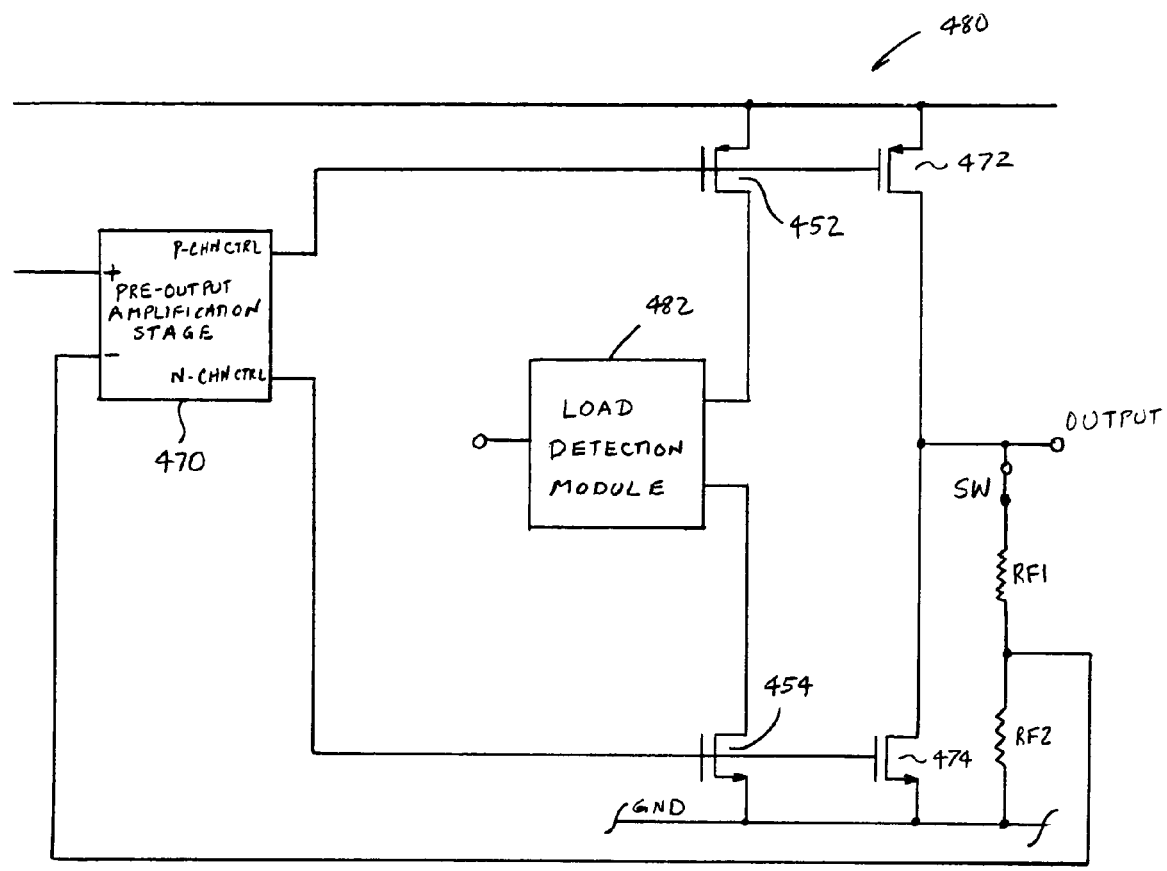

FIG. 4B-1 illustrates a schematic diagram of an exemplary output load detection second sub-circuit 450 in accordance with another embodiment of the invention. The second sub-circuit 450 is used to detect whether a load is connected to the output of the video circuit 102 when the video amplifier 420 of the video circuit 102 is ON. In particular, the second sub-circuit 450 generates a logic high level signal when a load is connected to the output of the video circuit 102, and a logic low level signal when no load is connected to the output of the video circuit 102.

More specifically, the output load detection second sub-circuit 450 comprises a pair of FETs 452 and 454, a resistor 456, a peak detector 458, a reference voltage source $V_{REF3}$, and an comparator 460. In this example, the output load detection second sub-circuit 450 is incorporated into the video operational amplifier 422 of the video circuit 102. In particular, the video operational amplifier 422 includes a pre-output amplification stage 470, and an output amplification stage comprising FETs 472 and 474. The switching element SW and the feedback resistors RF1 and RF2 are also shown connected in series between the output of the video circuit 102 and the ground potential rail. The node between feedback resistors RF1 and RF2 may be coupled to the negative input of the pre-output amplification stage 470 or by way of one or more other pre-output amplification stages. Since the output load detection first sub-circuit 450 detects whether a load is connected to the output of the video circuit 102 when the video amplifier 420 is in the ON state, the switching element SW is shown in the closed position so that the pre-output amplification stage 470 is coupled to the output of the video circuit 102.

The sources and gates of the FETs 452 and 472 are respectively coupled to the power supply rail $V_{DD}$ and the p-channel control output of the pre-output amplification stage 470. The sources and gates of the FETs 454 and 474 are respectively coupled to the ground potential rail and the n-channel control output of the pre-output amplification stage 470. The drains of the FETs 452 and 454 are coupled to the input of the peak detector 458. The drains of the FETs 472 and 474 are coupled to the output of the video circuit 102. The resistor 456 is coupled between the input of the peak detector 458 and ground. The output of the peak detector 458 is coupled to the positive input of the comparator 460. The reference voltage source $V_{REF3}$ is coupled between the negative input of the comparator 460 and the ground potential rail. The comparator 460 generates at its output a logic level signal indicative of whether there is a load connected to the output of the video circuit 102.

In the exemplary embodiment, the feedback resistors RF1 and RF2 are each much greater than the expected load resistance (i.e., RF1>>RLOAD, and RF2>>RLOAD). Also, in the exemplary embodiment, the channel width-to-length ratio of FETs 472 and 474 are approximately m times (e.g., m>1, (e.g., m≈100)) larger than FETs 452 and 454. In addition, the resistor 456 is also approximately m times larger than the load (e.g., resistor 456≈m150Ω). In this example, the FETs 452 and 454 and resistor 456 operate to replicate the output stage of the video amplifier 422 (FETs 472 and 474, and the potential load), but with a power consumption factor of m times smaller than the output of the video amplifier 422.

In operation, the current at the output of the video amplifier depends on whether there is a load connected to the output. A relatively high output current is generated when there is a load connected to the output, and a relatively low output current is generated when there is no load connected to the output. Essentially the same current reduced by a factor of m is generated in the replica circuit comprising FETs 452 and 454, and resistor 456. Accordingly, the voltage at the input of the peak detector 458 also depends on whether there is a load connected to the output. A relatively high voltage at the input of the peak detector 458 is generated when there is a load connected to the output, and a relatively low voltage at the input of the peak detector 458 is generated when there is no load connected to the output.

The peak detector 458 outputs the peak of its input voltage. If the reference voltage $V_{REF3}$ is set to be approximately midway between the relatively high peak voltage at the output of the peak detector 458 when there is a load present at the output of the video circuit 102, and the relatively low peak voltage at the output of the peak detector 458 when there is no load present at the output of the video circuit 102 (e.g., approximately 400 millivolts), then the comparator 460 is able to generate a logic level voltage indicative of whether there is a load connected to the output of the video circuit 102 (e.g., a high logic level when there is a load present, and a low logic level when there is no load present).

FIG. 4B-2 illustrates a schematic diagram of another exemplary output load detection sub-circuit 480 (for use when the video amplifier is ON) in accordance with another embodiment of the invention. The load detection sub-circuit 480 is basically the same as that of circuit 450, except that circuit 480 has a different load detection module 482 as oppose to the resistor 456, peak detector 458, comparator 460, and reference voltage source $V_{REF3}$. The load detection module 482 interfaces with the replica FETs 452 and 454 to receive a parameter that varies dependent on whether a load is connected to the output of the video circuit 102. Using such parameter, the load detection module 482 can generate a logic level signal indicative of whether a load is connected to the output of the video circuit 102.

Although the exemplary embodiments described herein use field effect transistors to implement the desired operation, it shall be understood that the exemplary embodiments may use other transistor technology, such as bipolar.

While the invention has been described in connection with various embodiments, it will be understood that the invention is capable of further modifications. This application is intended to cover any variations, uses or adaptation of the invention following, in general, the principles of the invention, and including such departures from the present disclosure as come within the known and customary practice within the art to which the invention pertains.

It is claimed:

1. A system for configuring a video circuit into a relatively low power consumption mode or a relatively high power consumption mode, comprising:

an input signal detection circuit, coupled to an input of the video circuit, the input signal detection circuit receives an input video signal from the input of the video circuit and generates a first signal indicative of whether the input video signal is present at the input of said video circuit;

an output load detection circuit, coupled to an output of the video circuit, the output load detection circuit receives an output video signal from the output of the video circuit and generates a second signal indicative of whether a load is connected to the output of said video circuit;

and a control device, coupled to the input signal detection circuit and the output load detection circuit, the control device generates a third signal responsive to said first and second signals;

wherein said third signal controls whether said video circuit is in said relatively low power consumption mode or in said relatively high power consumption mode;

wherein the input signal detection circuit and the output load detection circuit are distinct from each other.

2. The system of claim 1, wherein said input signal detection circuit comprises:

a first sub-circuit adapted to generate only a plurality of sync pulses from said input video signal;

a second sub-circuit adapted to generate edge-pulses for each edge of said sync pulses; and a third sub-circuit adapted to generate said first signal comprising a first logic level in response to receiving a plurality of said edge-pulses, and a second logic level in response to not receiving said edge-pulses.

3. The system of claim 2, wherein said first sub-circuit comprises a comparator including a first input adapted to receive said input video signal, a second input adapted to receive a reference voltage, and an output coupled to said second sub-circuit.

4. The system of claim 2, wherein said second sub-circuit comprises:
a delay device adapted to receive said sync pulses generated by said first sub-circuit;
and an exclusive-OR gate including a first input adapted to receive said sync pulses generated by said first sub-circuit,
and a second input coupled to an output of said delay device.

5. The system of claim 2, wherein said third sub-circuit comprises:
a first transistor including a first control input coupled to an output of said second sub-circuit, a first current input coupled to a power supply rail, and a first current output;
a second transistor including a second control input coupled to said output of said second sub-circuit, a second current output coupled to a ground potential rail, and a second current input coupled to said first current output of said first transistor;
a capacitor coupled between said first current output and said ground potential rail; and
an inverter coupled to said capacitor.

6. The system of claim 5, wherein said first transistor comprises a first field effect transistor, and/or said second transistor comprises a second field effect transistor.

7. The system of claim 5, wherein said first transistor comprises a first bipolar transistor, and/or said second transistor comprises a second bipolar transistor.

8. The system of claim 1, wherein said output load detection circuit comprises:
a first sub-circuit adapted to generate said second signal when said video circuit is in said relatively low power consumption mode; and
a second sub-circuit adapted to generate said second signal when said video circuit is in said relatively high power consumption mode.

9. The system of claim 8, wherein said first sub-circuit comprises:
a first sub-sub-circuit adapted to periodically generate a test current towards said output of said video circuit;
a second sub-sub-circuit adapted to compare a voltage at said output of said video circuit produced by said test current, with a reference voltage, and generate a logic level signal indicative of whether said voltage is above or below said reference voltage; and
a third sub-sub-circuit to produce said second signal comprising said logic level signal.

10. The system of claim 9, wherein said first sub-sub circuit comprises:
an inverter including an input to receive a control signal including a plurality of test pulses;
a field effect transistor including a gate coupled to an output of said inverter, a source coupled to a power supply rail, and a drain; and
a resistive element coupled between said drain of said field effect transistor and said output of said video circuit;

wherein said second sub-sub-circuit comprises a latching comparator including a first input coupled to said output of said video circuit, a second input coupled to a reference voltage source, an output, and a latch enable input adapted to receive said control signal; and
wherein said third sub-sub-circuit comprises a NAND gate including a first input coupled to said output of said inverter, and a second input coupled to said output of said latching comparator.

11. The system of claim 8, wherein said second sub-circuit comprises:
a first sub-sub-circuit adapted to generate a test current proportional to a current at said output of said video circuit; and
a second sub-sub-circuit adapted to generate said second signal in response to said test current.

12. The system of claim 11, wherein said first sub-sub-circuit comprises:
a first field effect transistor including a first gate coupled to a first output gate of a first output field effect transistor of said video circuit, a first source coupled to a power supply rail, and a first drain; and
a second field effect transistor including a second gate coupled to a second output gate of a second output field effect transistor of said video circuit, a second source coupled to a ground potential rail, and a second drain coupled to said first drain of said first field effect transistor;
wherein said second sub-sub-circuit comprises:
a resistive element coupled between said first and second drains, and said ground potential rail;
a peak detector including an input coupled to said first and second drains, and said ground potential rail; and
a comparator including a first input coupled to an output of said peak detector, a second input coupled to a reference voltage source, and an output adapted to generate said second signal.

13. The system of claim 1, wherein said control device comprises a state machine.

14. The system of claim 1, further comprising said video circuit.

15. The system of claim 14, wherein said video circuit comprises:
a low pass filter including an input adapted to receive said input video signal; and a video amplifier including an input coupled to an output of said low pass filter.

16. A method for configuring a video circuit into a relatively low power consumption mode and a relatively high power consumption mode, comprising:
detecting an input presence condition at an input of said video circuit;
detecting a load condition at an output of said video circuit; and
configuring said video circuit into said relatively high power consumption mode if an input video signal is present at said input of said video circuit and a load is connected to said output of said video circuit, or configuring said video circuit into said relatively low power consumption mode if either said input video signal is not present at said input of said video circuit or said load is not connected to said output of said video circuit;
wherein the steps of detecting the input presence condition at the input of the video circuit and detecting the load condition at the output of the video circuit are performed by circuits that are distinct from each other.

17. The method of claim 16, wherein detecting the input presence condition at said input of said video circuit comprises generating a logic level signal indicative of whether said input video signal is present at said input of said video circuit.

18. The method of claim 17, wherein generating said logic level signal comprises:
   attempting to detect sync pulses of said input video signal; and
   setting said logic level signal to a first state if said sync pulses of said input video signal are detected, or setting said logic level signal to a second state if said sync pulses of said input video signal are not detected.

19. The method of claim 18, wherein said sync pulses comprise composite sync pulses of said input video signal.

20. The method of claim 19, wherein generating said logic level signal comprises:
   generating a first signal consisting of said composite sync pulses from said input video signal;
   generating a second signal comprising edge-pulses resulting from respective edges of said composite sync pulses; and
   processing said second signal to generate a third signal; and
   generating said logic level signal from said third signal.

21. The method of claim 16, wherein detecting the load condition at said output of said video circuit comprises generating a logic level signal indicative of whether said load is connected to said output of said video circuit.

22. The method of claim 21, wherein generating said logic level signal comprises:
   forming a test current at said output of said video circuit;
   setting said logic level signal to a first state if said test current is above a threshold level, or setting said logic level signal to a second state if said test current is below said threshold level.

23. The method of claim 21, wherein generating said logic level signal comprises:
   generating a test current related to a current at said output of said video circuit; and
   setting said logic level signal to a first state if said test current is above a threshold level, or setting said logic level signal to a second state if said test current is below said threshold level.

24. A method for configuring a video circuit into a relatively low power consumption mode and a relatively high power consumption mode, comprising:
   detecting whether an input video signal is present at an input of said video circuit; and
   configuring said video circuit into said relatively high power consumption mode if said input video signal is present at said input of said video circuit, or configuring said video circuit into said relatively low power consumption mode if said input video signal is not present at said input of said video circuit;
   wherein, said detecting whether said input video signal is present at said input of said video circuit further comprises;
   generating a logic level signal indicative of whether said input video signal is present at said input of said video circuit;
   attempting to detect sync pulses of said input video signal; and
   setting said logic level signal to a first state if said sync pulse of said input video signal are detected, or setting said logic level signal to a second state if said sync pulses of said input video signal are not detected.

* * * * *